US008677318B2

(12) United States Patent
Mohindra et al.

(10) Patent No.: US 8,677,318 B2
(45) Date of Patent: *Mar. 18, 2014

(54) MANAGEMENT OF COMPOSITE SOFTWARE SERVICES

(75) Inventors: Ajay Mohindra, Yorktown Heights, NY (US); Vijay K. Naik, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 1299 days.

This patent is subject to a terminal disclaimer.

(21) Appl. No.: 12/054,191

(22) Filed: Mar. 24, 2008

(65) Prior Publication Data

US 2008/0168424 A1    Jul. 10, 2008

Related U.S. Application Data

(63) Continuation of application No. 11/453,508, filed on Jun. 15, 2006, now abandoned.

(51) Int. Cl.
*G06F 9/44* (2006.01)
*G06F 9/45* (2006.01)
*G06F 15/16* (2006.01)
*G06F 15/177* (2006.01)
*G06F 15/173* (2006.01)

(52) U.S. Cl.
USPC ........... 717/121; 717/120; 717/137; 717/150; 709/218; 709/219; 709/220; 709/224

(58) Field of Classification Search
USPC ................... 717/120, 174, 177; 709/224, 226
See application file for complete search history.

(56) References Cited

U.S. PATENT DOCUMENTS

| 6,286,047 B1 * | 9/2001 | Ramanathan et al. ........ 709/224 |
| 6,330,689 B1 * | 12/2001 | Jin et al. .......................... 714/15 |
| 6,330,710 B1 | 12/2001 | O'Neil et al. |
| 6,336,138 B1 | 1/2002 | Caswell et al. |

(Continued)

FOREIGN PATENT DOCUMENTS

| EP | 1548586 A | 6/2005 |
| WO | 2007146356 A2 | 12/2007 |

(Continued)

OTHER PUBLICATIONS

SmartFrog: Configuration and Automatic Ignition of Distributed Applications by Goldsack et al, HP Labs, May 29, 2003.*

(Continued)

*Primary Examiner* — Emerson Puente
*Assistant Examiner* — Charles Swift
(74) *Attorney, Agent, or Firm* — Yee & Associates, P.C.; Preston Young (57) ABSTRACT

A computer implemented method, data processing system, computer usable program code, and active repository are provided for management of a software service. A request is received to deploy the software service in a computer network. A dependency analysis is performed for the requested software service to determine component software services and physical resources necessary to deploy and manage new software service as a composite in responsive to the software service being the new software service. An active object is created to manage the new software service using an active template based on the analysis. The new software service is deployed in the computer network using the active object. The new software service is managed using the active object.

20 Claims, 6 Drawing Sheets

(56) References Cited

U.S. PATENT DOCUMENTS

| | | | |
|---|---|---|---|
| 6,901,442 B1 * | 5/2005 | Schwaller et al. | 709/224 |
| 7,013,461 B2 * | 3/2006 | Hellerstein et al. | 717/177 |
| 7,076,728 B2 | 7/2006 | Davis et al. | |
| 7,096,459 B2 | 8/2006 | Keller et al. | |
| 7,103,597 B2 | 9/2006 | McGoveran | |
| 7,103,874 B2 | 9/2006 | McCollum et al. | |
| 7,111,052 B1 | 9/2006 | Cook | |
| 7,181,743 B2 | 2/2007 | Werme et al. | |
| 7,216,158 B2 | 5/2007 | Revanuru et al. | |
| 7,222,149 B2 | 5/2007 | Hamadi et al. | |
| 7,243,306 B1 | 7/2007 | Joshi et al. | |
| 7,313,793 B2 * | 12/2007 | Traut et al. | 718/1 |
| 7,340,654 B2 | 3/2008 | Bigagli et al. | |
| 7,343,601 B2 | 3/2008 | Azagury et al. | |
| 7,366,768 B2 * | 4/2008 | Deo et al. | 709/217 |
| 7,426,736 B2 | 9/2008 | Cole et al. | |
| 7,464,154 B2 * | 12/2008 | Dick et al. | 709/224 |
| 7,496,893 B2 | 2/2009 | Mohindra et al. | |
| 7,519,711 B2 | 4/2009 | Mohindra et al. | |
| 7,584,454 B1 | 9/2009 | Massoudi | |
| 7,620,653 B1 | 11/2009 | Swartz | |
| 7,668,741 B2 | 2/2010 | Ernest et al. | |
| 7,672,882 B2 | 3/2010 | Agarwal et al. | |
| 7,694,303 B2 | 4/2010 | Hahn et al. | |
| 7,703,029 B2 | 4/2010 | Bozak et al. | |
| 7,712,100 B2 | 5/2010 | Fellenstein et al. | |
| 7,899,903 B2 | 3/2011 | Sanghvi et al. | |
| 7,926,051 B2 | 4/2011 | Barta et al. | |
| 7,945,041 B2 | 5/2011 | Caswell et al. | |
| 7,945,671 B2 | 5/2011 | Mohindra et al. | |
| 7,950,007 B2 | 5/2011 | Mohindra et al. | |
| 8,140,677 B2 | 3/2012 | Chalasani et al. | |
| 2003/0167270 A1 * | 9/2003 | Werme et al. | 707/10 |
| 2004/0003390 A1 | 1/2004 | Canter et al. | |
| 2004/0049565 A1 | 3/2004 | Keller et al. | |
| 2004/0060054 A1 | 3/2004 | Das et al. | |
| 2004/0068501 A1 | 4/2004 | McGoveran | |
| 2004/0103195 A1 * | 5/2004 | Chalasani et al. | 709/226 |
| 2004/0139176 A1 * | 7/2004 | Farrell et al. | 709/220 |
| 2004/0237077 A1 | 11/2004 | Cole et al. | |
| 2004/0261060 A1 | 12/2004 | Haselden et al. | |
| 2005/0102665 A1 * | 5/2005 | Barta et al. | 717/174 |
| 2005/0138084 A1 * | 6/2005 | Azagury et al. | 707/200 |
| 2006/0195559 A1 | 8/2006 | Winter et al. | |
| 2006/0294238 A1 | 12/2006 | Naik et al. | |
| 2007/0005536 A1 | 1/2007 | Caswell et al. | |
| 2007/0050431 A1 | 3/2007 | Vaidya et al. | |
| 2007/0260723 A1 * | 11/2007 | Cohen et al. | 709/223 |
| 2007/0294364 A1 | 12/2007 | Mohindra et al. | |
| 2007/0294405 A1 | 12/2007 | Mohindra et al. | |
| 2007/0294420 A1 | 12/2007 | Mohindra et al. | |
| 2007/0294668 A1 | 12/2007 | Mohindra et al. | |
| 2008/0072220 A1 | 3/2008 | Saffre et al. | |
| 2008/0168424 A1 * | 7/2008 | Mohindra et al. | 717/120 |
| 2008/0209397 A1 | 8/2008 | Mohindra et al. | |
| 2008/0275935 A1 | 11/2008 | Mohindra et al. | |

FOREIGN PATENT DOCUMENTS

| | | |
|---|---|---|
| WO | 2007146366 A2 | 12/2007 |
| WO | 2007146367 A2 | 12/2007 |
| WO | 2007146368 A2 | 12/2007 |

OTHER PUBLICATIONS

Hashemian et al., "A Graph-Based Approach to Web Services Composition", Proceedings of the 2005 Symposium on Applications and the Internet, Jan. 2005, Trento, Italy, pp. 183-189.

Casati et al., "Adaptive and Dynamic Service Composition in eFlow", 2000, HP Laboratories, Palo Alto, USA, retrieved Sep. 20, 2010 http://www.hpl.hp.com/techreports/2000/HPL-2000-39.pdf.

EP Search report for application EP07796092 dated Sep. 21, 2010.

Goldsack et al., "SmartFrog: Configuration and Automatic Ignition of Distributed Applications", May 29, 2003, HP OVUA 2003, pp. 19.

Anderson, "Towards a High-Level Machine Configuration System", Sep. 19-23, 1994 LISA Conference, San Diego, CA, pp. 19-26.

USPTO office action for U.S. Appl. No. 11/453,508 dated Oct. 29, 2009.

Foster et al., "Grid services for distributed system integration", Computer, vol. 35, No. 6, pp. 37-46, Jun. 2002.

Friese et al., "Hot service deployment in an ad hoc grid environment", ACM, 2004, pp. 75-83.

USPTO office action for U.S. Appl. No. 11/453,514 dated Sep. 16, 2010.

USPTO final office action for U.S. Appl. No. 12/114,387 dated Jun. 9, 2010.

European Supplemental Search Report, dated Jun. 23, 2009, regarding Application No. EP 2035944, 5 pages.

International Search Report, dated Dec. 21, 2007, regarding Application No. WO 2007/146356, 3 pages.

International Search Report, dated Dec. 21, 2007, regarding Application No. WO 2007/146366, 3 pages.

International Search Report, dated Dec. 21, 2007, regarding Application No. WO 2007/146367, 2 pages.

International Search Report, dated Dec. 21, 2007, regarding Application No. WO 2007/146368, 2 pages.

USPTO Office Action, dated Oct. 20, 2008, regarding U.S. Appl. No. 11/453,507, 13 pages.

USPTO Notice of Allowance, dated Dec. 3, 2008, regarding U.S. Appl. No. 11/453,507, 9 pages.

USPTO Office Action, dated Oct. 29, 2009, regarding U.S. Appl. No. 11/453,508, 25 pages.

USPTO Notice of Allowance, dated Jan. 18, 2011, regarding U.S. Appl. No. 11/453,514, 7 pages.

USPTO Office Action, dated May 27, 2008, regarding U.S. Appl. No. 11/453,741, 9 pages.

USPTO Notice of Allowance, dated Sep. 10, 2008, regarding U.S. Appl. No. 11/453,741, 7 pages.

USPTO Office Action, dated Dec. 15, 2009, regarding U.S. Appl. No. 12/114,387, 23 pages.

USPTO Notice of Allowance, dated Jan. 6, 2011, regarding U.S. Appl. No. 12/114,387, 15 pages.

USPTO Office Action, dated Aug. 1, 2011, regarding U.S. Appl. No. 12/115,637, 31 pages.

USPTO Notice of Allowance, dated Jan. 10, 2012, regarding U.S. Appl. No. 12/115,637, 8 pages.

\* cited by examiner

MANAGEMENT OF COMPOSITE SOFTWARE SERVICES

This application is a continuation of application Ser. No. 11/453,508, filed Jun. 15, 2006, now abandoned.

BACKGROUND OF THE INVENTION

1. Field of the Invention

The present invention relates generally to networked computer systems. More particularly, the present invention relates to software and systems management in networked computer environments.

2. Description of the Related Art

Distributed environments such as clusters of computing systems, data centers, and grid systems involve managing a large number of resources and service components. Typical end-service provided to the users of such systems require composition of multiple resources and service components, which together deliver the end-service that is of interest to the users. Such composition of multiple components require careful configuration of the components and deployment of these components, such that they interface with each other in a compatible manner so that the composite service is deployed, initialized, handles the workload submitted by users, handles component level faults gracefully, and provides robust service while handling fluctuations in the workload.

Realizing such composition from components involve orchestration of a large number of heterogeneous resources and service components. Managing the various tasks manually tends to be tedious and error prone. The magnitude of the complexity increases when resources belong to multiple administrative domains. While grid-based systems can facilitate resource sharing across multiple administrative domains, the grid-based systems are much harder to manage from a system administration point of view. One reason for the harder management is that the current state-of-the-art in system management technology has not kept pace with the advances in middleware and grid technologies. Some progress has been made in managing single or cluster-based systems. Even for such systems, system administrators face a much higher level of complexity when they configure and deploy a new service on an existing infrastructure or manage the lifecycle of the existing service and software stack. The situation is much worse in a complex application environment; for example, an environment involving orchestration of a workflow formed by multiple business processes. In such a case, deployment and life cycle management solutions need to take an integrated view of the multiple tiers involved and current system management technologies do not provide the necessary means to build such solutions.

Traditional methods for configuration and deployment of software components rely heavily upon domain experts' knowledge about the component requirements, availability of middleware and the underlying infrastructure, and overall IT environment. Using this background knowledge, a system administrator is first required to configure the existing infrastructure and then customize the configuration and deployment steps for a new component, so the new component can be deployed successfully. In case of distributed components, such an approach can be time consuming, error prone, and non-scalable to large scale installations. Further, such an approach does not lend itself to automation as system administrators are key components in the deployment workflow.

The ability to configure and manage large installations of systems has been an active area of research within the information technology community. The Local Configuration (LCFG) is a currently used script based system that dynamically configures machines based upon configuration information stored in a central database (Anderson, P., "Towards a High-Level Machine Configuration System," LISA, 1994). The information pertains to network, system and services that need to be configured on the system. Smart Framework for Object Groups (SmartFrog) is a known system for specifying the configuration, and deployment of distributed applications (Goldsack, P., Guijarro, J., Mecheneau, G., Murray, P., Toft, P., "SmartFrog: Configuration and Automatic Ignition of Distributed Applications," HP OVUA 2003). SmartFrog provides a language to specify the configuration of applications and dependencies between them. SmartFrog provides an infrastructure for processing and deploying applications on the distributed systems. The GridWeaver project is exploring the notion of combining LCFG and SmartFrog technologies for configuration management of large systems. The Organization for the Advancement of Structured Information Standards (OASIS) effort is looking at managing distributed resources using Web services. The Grid Forum is attempting to standardize the specification language as part of the Configuration Description, Deployment, and Lifecycle Management (CDDLM) activity.

Some technologies provide means to monitor individual Java™ 2 Platform Enterprise Edition (J2EE) components that are participating in providing a service. The technology helps system administrators to monitor performance, identify failures, and check performance bottlenecks.

SUMMARY OF THE INVENTION

A computer implemented method, data processing system, computer usable program code, and active repository are provided for management of a composite software service. The illustrative embodiments receive a request for using the software service. If the software service is not yet deployed in the computer network, the illustrative embodiments configure and deploy a new instance of the software service in the computer network. If the software service is deployed but is not adequately configured and provisioned to perform at a level required by the request, the software service is reconfigured and redeployed. The illustrative embodiments perform an analysis of other supporting software services and physical resources needed to deploy the software service and may reconfigure and/or deploy additional software services to enable the deployment of the software service.

To perform these management functions, the illustrative embodiments create an active object in an active repository to manage the new software service using an active template based on the analysis. The illustrative embodiments deploy the new software service in the computer network using the active object and manage the new software service throughout its lifecycle using the active object. The active objects in the active repository interact with one another while controlling and managing the software services. These interactions lead to service management actions such that desired service compositions are realized by the software services and the compositions are maintained in their desired states.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The following document uses the term physical resource or resource to mean a hardware resource such as a computer server, a computer network, a file system, etc. Such resources may be turned on or off, shared or used in dedicated mode, and have a physical location. The term computer service is used to indicate a service provided by a computer program that runs on top of one or more resources.

Figure 1:
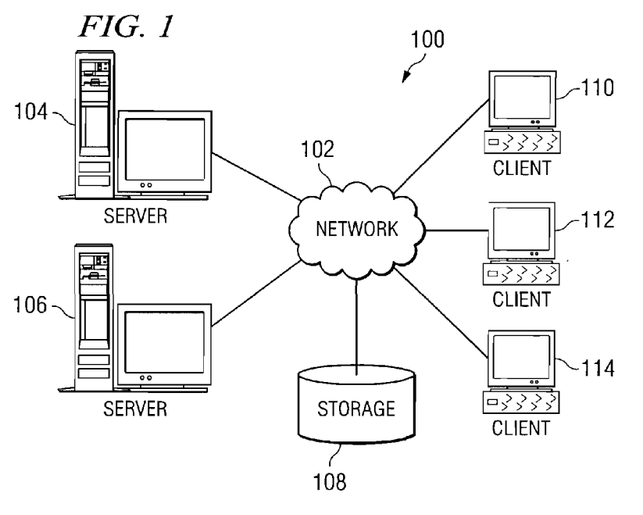
FIG. 1 depicts a pictorial representation of a network of data processing systems in which aspects of the illustrative embodiments may be implemented.
Figure 2:
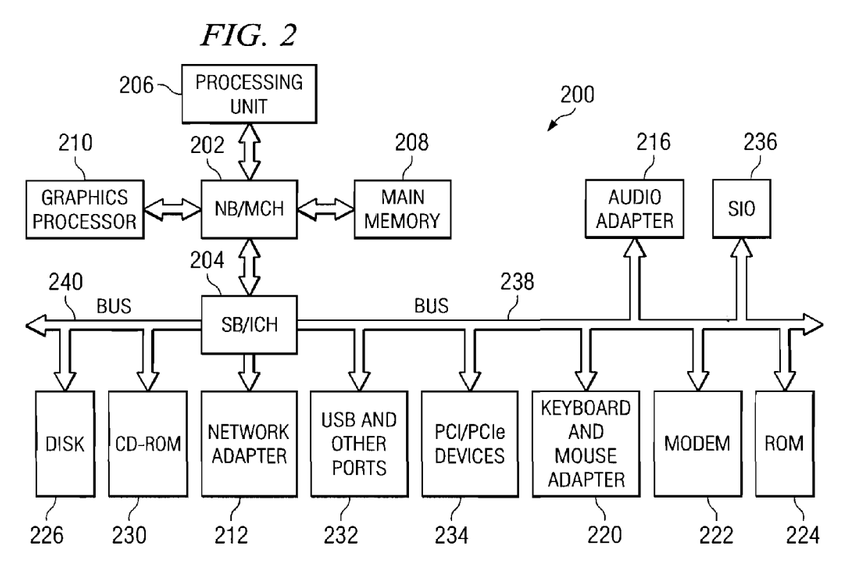
FIG. 2 depicts a block diagram of a data processing system in which aspects of the illustrative embodiments may be implemented.

The illustrative embodiments provide a solution to the management of software components and services. With reference now to the figures and in particular with reference to FIGS. 1-2, exemplary diagrams of data processing environments are provided in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope of the illustrative embodiments.

With reference now to the figures, FIG. 1 depicts a pictorial representation of a network of data processing systems in which aspects of the illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which aspects of the illustrative embodiments may be implemented. Data processing system 200 is an example of a computer, such as server 104 or client 110 in FIG. 1, in which computer usable code or instructions implementing the processes for embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the illustrative embodiments provide for a computer implemented method, apparatus, and computer usable program code for compiling source code. The methods of the illustrative embodiments may be performed in a data processing system, such as data processing system 100 shown in FIG. 1 or data processing system 200 shown in FIG. 2.

The illustrative embodiments provide a computer implemented method, data processing system, computer usable program code and active repository for the management of software services. A software service is a service provided by a computer program or a collection of programs that runs on a local and/or remote computer network, provides partial or complete solution to a service request, and does not require the requester to perform any of the management tasks associated with the service including configuration, deployment, and life-cycle management tasks. Some examples of a software service are a payroll service, customer relation service, supply-chain management service, search engine service, e-mail service, authentication service, messaging service, a generic application management service such as the one provided by WebSphere® Application Server, database service, network connectivity service, and so on.

Software service management includes service dependency analysis, planning and scheduling resources and deployed services, configuration management, deployment management, and post-deployment lifecycle management. These management functions are themselves software services. The illustrative embodiments provide these management services so that the necessary installation, configuration, and deployment of software services are performed in a systematic and controlled manner in response to service requests from users. Further, the embodiments manage the deployed services so that the services perform at the level desired by current request workload and/or anticipated future workloads and these services are taken offline or terminated when not required or require maintenance.

The illustrative embodiments provide management services to maintain the deployed services in a desired state and take corrective actions when the service state deviates from the desired state. In response to an alert pertaining to a particular service, the management services in the embodiments automatically trigger analysis to determine the cause of the alert, determine if an alternate resource or supporting service needs to be used, and redeploy the managed services using alternate resources and/or services. These management services are scalable, inherently autonomic, and may manage services for multiple platforms.

Figure 3:
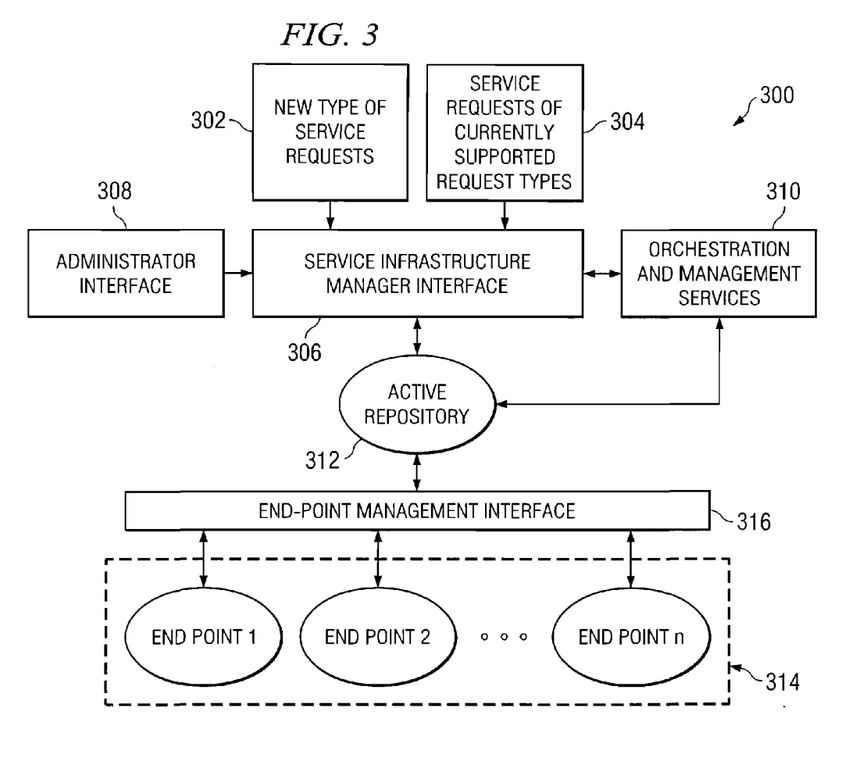
FIG. 3 depicts a composition based service management infrastructure using an active repository for configuration and deployment in accordance with an illustrative embodiment.

FIG. 3 depicts a composition based service management infrastructure using an active repository for configuration and deployment in accordance with an illustrative embodiment. In composition based service management infrastructure 300, new type of service requests 302 and service requests of currently supported request types 304 arrive at service infrastructure manager interface 306. A service request is a request for service either from (i) an end-user, (ii) another service in the system, or (iii) another service elsewhere in the network. The requested service is a service that the system is capable of providing using one or more software services and physical resources supported by the system.

Note that a request may be processed by multiple software services before completion and all such services need to be made available by configuring, deploying, and managing at runtime. A software service may be supported by the system, but the software service may not be configured and deployed at all times. Even if the software service is configured and deployed, the software service may not be configured to fulfill the requirements of the service request in terms of desired performance and/or the manner in which the service is to be delivered; e.g., a request may ask for a service to be delivered in secure or in dedicated service delivery mode.

New type of service requests 302 consist of requests for software services, which are currently not configured and deployed in the system. Service requests of currently supported request types 304 are those requests that are requesting services that are already configured and deployed in the system. Also, note that the requests, of new or currently supported types, are serviced by software services that run on end-point resources 314. Processing of the requests at service infrastructure manager interface 306 takes place transparent to the service requesters.

Administrators may interact with the system for performing actions, such as setting policies, configuring or reconfiguring resource states, for configuring and deploying software services by overriding default settings, etc. using administrator interface 308. Commands issued by administrators are sent via administrator interface 308 to service infrastructure manager interface 306. At the backend, service infrastructure manager interface 306 interacts with orchestration and management services 310 and active repository 312. Active repository 312 consists of active objects and active templates. The active objects interact with end-point resources 314 or with the software services that run on top of the end-point resources via end-point management interface 316. In addition, orchestration and management services 310 also interact with active repository 312. As mentioned earlier, requests are actually processed at end-point resources 314.

Figure 4:
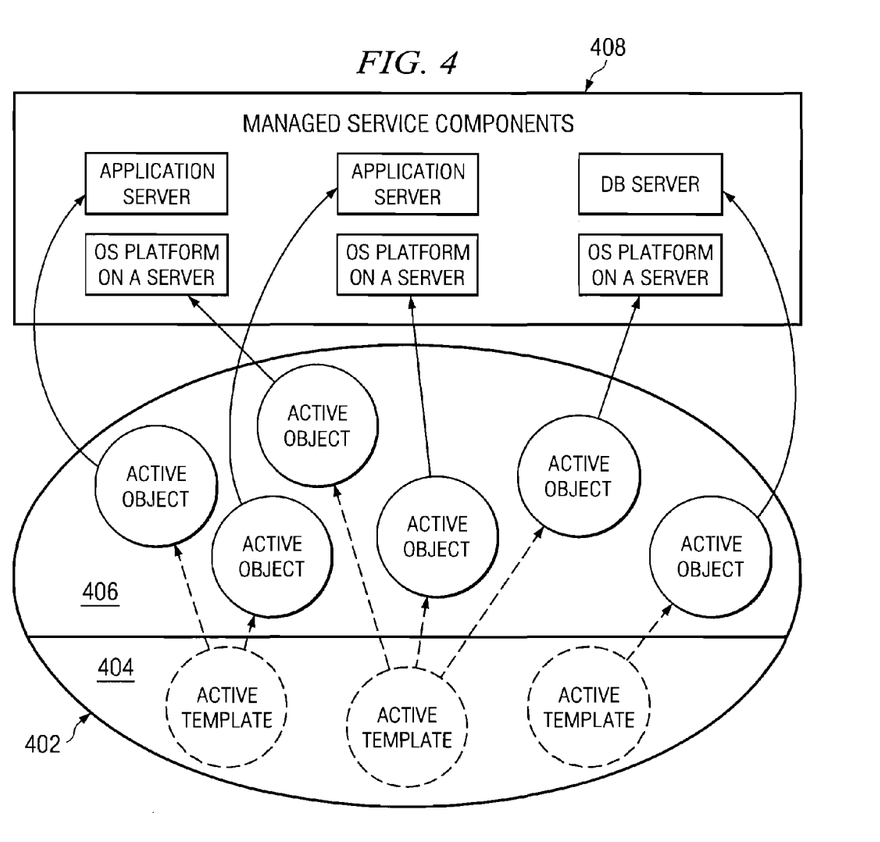
FIG. 4 depicts the components of an active repository in accordance with an illustrative embodiment.

FIG. 4 depicts the components of an active repository in accordance with an illustrative embodiment. Active repository 402 may be an active repository, such as active repository 312 of FIG. 3. As described previously, active repository 402 consists of active templates 404 and active objects 406. An active template is a template for an active object. An active object is a management object that is used to manage an instantiated or to be instantiated service instance, such as one of managed service components 408, using available resources and other managed service instances. Each physical resource and service component in the system has a representative active object in active repository 402. The active object manages that resource or that service component by performing state and dependency management, configuration, deployment, and lifecycle management. For each type of service being managed, there is an active template in active templates 404 in active repository 402.

Whenever a new instance of a service is instantiated, a new active object is also instantiated in active objects 406 from an active template in active templates 404 that represents the type of service being instantiated. However, not every active template in active templates 404 may have an instantiated active object in active objects 406 at all times.

As new services are composed and instantiated on top of existing services and/or physical resources, new active objects are instantiated in active objects 406. Similarly, when a composite service is no longer needed, both the composite service and the active object used to manage that composite service are both terminated. The terminated active object is garbage collected. In addition, the active objects within active objects 406 corresponding to the component services or resources used to support and compose the service being terminated are all updated to reflect the fact that they are no longer supporting the composite service. When a component service is no longer needed, the corresponding active object within active objects 406 is destroyed and garbage collected, unless the policies dictate otherwise. For example, a policy may dictate that at least one service instance be deployed at all times regardless of the current demand on that service. In such a case all instances of that service, except the last one, are terminated when there is no demand for that service.

Active templates 404 are updated as their scope changes or as the environment controlled by the corresponding active object within active objects 406 evolves or fixes are to be applied to active objects 406. New active templates are also introduced into active templates 404 when new types of resources or services are introduced in the managed environment. For example, when WebSphere® 6.0 is introduced in the system as an Enterprise JavaBeans™ (EJB) container service, a new template is introduced in active templates 404. This is done even if an active template for WebSphere® 5.x existed in the active templates 404. This is because managing WebSphere® 6.0 is significantly different than managing WebSphere® 5.x containers. The active template has information on service being provided, dependency requirements, configuration and deployment information for one or more platforms.

When WebSphere® 6.01 is to be supported, a new template is not introduced, but the existing template is updated to accommodate the differences. The update is performed because the differences in two release versions are small from the point of view of management. The active objects derived from the template may manage a WebSphere® 6.0 container as well as a WebSphere® 6.01 container. Similarly, if initially WebSphere® 6.0 is to be deployed only on Linux® platforms, the template for WebSphere® 6.0 has the information for managing the container on Linux® platforms only. If later, WebSphere® 6.0 is to be deployed and supported on Windows® platforms as well, the template for WebSphere® 6.0 needs to be updated to add this capability, which is an example of changing the scope of a template.

Each active object in active objects 406 in active repository 402 is programmed to manage a particular resource or a service component to deliver component specific service by achieving a desired state. A desired state is the state required to achieve a desired effect or behavior from the actual service instance managed by the active object. Each active object in active objects 406 is aware of the current state and the desired state of the managed resource or service component for which it has management responsibilities. The desired state of an active object may be influenced by system administrators, policy managers, or other objects in the system. Active repository 402 provides facilities for performing lookup, service/resource brokering, for creating group memberships, setting policies, and so on.

The controls for configuration and deployment are executed at two levels: one is at micro-level and the other is at macro-level. The micro-level controls operate at the level of service template and service instance objects. Overall controls necessary to orchestrate multiple services in support of one or more higher level services are facilitated by the macro-level controls. The macro-level controls allow management services to orchestrate actions such as federated service configuration and deployment in a consistent manner. The macro-level system controls are built on top of and by leveraging the micro-level system controls.

All planning related logic such as for dependency resolution and sharing of supporting services is encapsulated in active objects 406. This logic is dynamically updatable and plug-ins may be inserted to add functionality that did not exist before.

Each of active objects 406 has four functional components for managing the service the active object represents in the active repository. The four management functional components in the illustrative examples are: monitor, analyze, configure, and execute (MACE). These are shown in FIG. 5.

Figure 5:
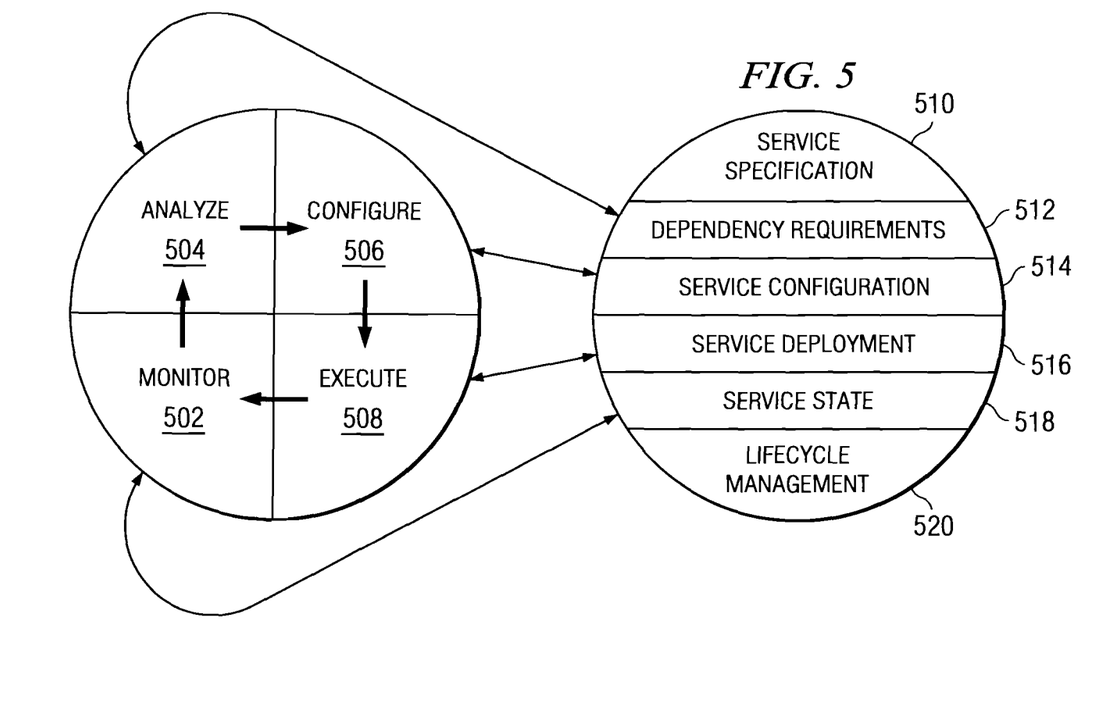
FIG. 5 depicts the exemplary functional components and management interfaces associated with an active object in accordance with an illustrative embodiment.

FIG. 5 depicts the exemplary functional components and management interfaces associated with an active object in accordance with an illustrative embodiment. An active object is an active object such as one of active objects 406 of FIG. 4. In these examples, monitoring functional component 502 monitors the following entities:
  (1) state of the managed service;
  (2) state of the services that the managed service component depends upon; i.e., the state of the service components that provide support to the managed service (if any);
  (3) state of service components supported by the managed component, i.e., the state of the service components dependent on the managed service component (if any); and
  (4) administrative input.

Analyze functional component 504 provides the decision making capability to an active object. It is triggered into action by one of the following events:
  (1) imbalances in the observed and desired state of the managed object;
  (2) imbalances in the functionality and service levels provided by the supporting components; and
  (3) imbalances in the functionality and the service levels demanded by the components supported by this component.

Any of the above imbalances can occur because of changes either (i) in the current state or (ii) in the desired state. For example, consider a WebSphere® Application Server that is installed on a server, but currently not launched. The current state of this Application Server is "Off line." If the desired state is set to "On line" with certain attributes (such as buffer sizes, number of requests to handle, connections to a particular database, etc.) this results in an imbalance that triggers the analyze component in corresponding active object. After it is made "On line" with the desired attributes, suppose that the current state changes to "On line" and "Lost connection to database." Again this results in an imbalance that triggers the analyze component into action. Changes in the current state are notified via the monitoring functional component 502. Changes in the desired state are brought about either by (i) the orchestration and management services or (ii) administrative actions via the administrative interface, or (iii) a request for service from another active object that requires action under the existing policies.

When analyze functional component 504 recognizes that there is an imbalance between the current and the desired state of the managed object, it performs an analysis to establishes an optimal configurable state to which the managed service can be transformed to. To perform this analysis, it takes into account the state and the availability of other services and resources in the system, as well as the demands and the priorities of the current and to be supported service components or workload. At the end of this analysis step the supporting resources and software services are completely determined and the parameters characterizing the support are finalized (e.g., number of connections, port number, expected response time, minimum guaranteed bandwidth etc.). Similarly, the characteristics of the supported services are also finalized.

The complexity and nature of the analysis depends on the decision choices available to the analyze functional component 504. The desired state may be specified with a high degree of precision (e.g., "On line" Websphere® instance of specific version, release, patch level, on a specific server with specific network adapters enabled, with specific IP addresses, and specific Web services deployed in a specific manner). In such cases, where there are no choices, the analyze component identifies the resources and services to use and configuration parameters to apply to the supporting services so that the managed service can achieve the desired state as prescribed.

On the other hand, the desired state may be specified with a range of possible states or with some degree of freedom (e.g., "On line" Websphere® instance that is version 6.0 compatible, on any of the servers in a particular network sub-domain, or the desired state of application server may be set to "On line" with no constraints on the server on which it is to be launched and thus, it could be the first available server or the constraint may require using a server with the largest amount of memory from a set of servers). When there are choices in selecting and configuring the supporting services and resources, analyze functional component 504 makes the decisions by interacting with other active templates and/or active objects.

This is accomplished by formulating and solving an optimization problem based on the available capacities and performance levels and the demands on those by existing and new services being considered for configuration and deployment. The objectives of the optimization problem are governed by the policies associated with the managed object. Some examples of policies associated with a managed service are exclusive use of the service by certain user groups at specified time periods, time set aside for maintenance purposes, preferred resource instances to use as support resources, and so on.

Analyze functional component 504 takes these policies into account and tries to resolve as many imbalances in the system as possible. If imbalances cannot be completely eliminated, analyze functional component 504 tries to satisfy the dependencies such that the achievable new state is closest to its desired state and a transition is possible from the current state to this new state. The outcome of this analysis determines the actual supporting services and resources to be used to correct the imbalances in the system. Since the state of these supporting services and resources determines the ultimate state to which the managed service may be transformed to, the managed service may not always realize the actual desired state but may realize a suboptimal state. Depending on how far that realized state is from the desired state, the analysis and the subsequent configuration and deployment steps may repeat.

Configure functional component 506 takes the output from analyze functional component 504 and performs the following tasks:
 (1) create a plan of action to configure or to reconfigure the existing state of the managed service component so the managed service component may transition from its current state to the new state in an optimal manner;
 (2) determine the actual commands, scripts, and procedures to run to bring the actual changes in the component; and
 (3) send request messages to the supporting service components before self configuration and send confirmation messages to the dependent service after the configuration changes are in place.

Execute functional component 508 performs the following tasks:
 (1) execution of the plan of actions determined by configure functional component 506 so that risks of failure are managed according to policies;
 (2) execution of verification steps to confirm that the desired changes have taken place;
 (3) execution of alternative action plans when initial plans do not succeed; and
 (4) verification of interactions with supporting and dependent components after the configuration changes are in place.

The encapsulation of the MACE function within each active object enables the corresponding managed software service to evolve independently and concurrently with other services and to adapt to the dynamic changes taking place in the system. Unlike prior-art in this area, these illustrative embodiments do not require a completely centralized evaluation of the service components to manage those components. The system described here allows for global policies to dictate the overall management of the system without requiring centralized decision making and execution capability. Whenever an active object needs to manipulate the managed object, the active object triggers a system runtime. The system runtime merely examines the state of the active object and performs actions contained in the active object. Some of these actions operate on the managed service and others on other active objects in the repository.

For example, an active object may issue a command asking the managed object to "go offline." In another instance, it may send a notification to another active object indicating that the support services are no longer needed from the service managed by the notified active object. The state of the active object may be affected by the external events such as resource monitors, service monitors, and other higher level active objects requesting management actions. When an event changes the state of the active object, the management components described earlier are activated and the active object starts to steer the managed service to a more stable state.

Each active object in an active repository is associated with management interfaces to monitor and control the behavior of the managed resources or services. Exemplary management interfaces provided by an active object, such as one of active objects 406 of FIG. 4 are shown in FIG. 5. The exemplary functional components, described earlier, of an active object perform their management actions over the managed object using the exemplary management interfaces. Such management actions are referred to as micro-level controls since the actions resulting from these controls affect individual end-point resources and software service instance. Exemplary management interfaces are as follows:
(1) Service specification 510;
(2) Dependency requirements 512;
(3) Service configuration 514;
(4) Service deployment 516;
(5) Service state 518; and
(6) Lifecycle management 520.

Active objects inherit these management interfaces from the active template from which the active object was instantiated in the first place. In the active templates the management interfaces are represented in a more generic manner covering multiple possible configurations and deployment and lifecycle management procedures.

Service specification 510 identifies the functionalities provided by a service. The service functionality includes both the actual physical value delivered to the client and the manner in which the actual physical value is delivered. The functions provided by a service may depend on the manner in which the service is configured and deployed. For example, a stock-quote service may be deployed to provide real-time quotes or delayed quotes. Similarly, a document delivery service may be configured to deliver encrypted or unencrypted documents. In a service template object, all available functions are listed. A service instance object lists the specific functions selected and those that are currently enabled in that instance.

Dependency requirements 512 has two parts:
(a) requirements on dependent services; and
(b) requirements on depending services.

The first part of dependency requirements 512 describes the dependency requirements for making the service available. In a service template object, dependencies are listed for each function the service is capable of delivering. In a service instance object, dependencies are listed only for the functions enabled in that instance. In addition to the resource dependencies (e.g., requires a server with at least two CPUs and Red Hat® Linux® Enterprise AS Release 3 OS), the dependency information also includes both the spatial (e.g., a service may depend on a database and a file system and these need to be available on the same subnet where the service is deployed) and temporal dependencies (e.g., a backup service may depend on access to high bandwidth network from 2 AM to 3 AM on each Friday).

The second part of dependency requirements 512 describes the requirements imposed on the services that depend on this service. This part is meaningful only for services that are not deployed as high-level services. A high-level service is one that does not support any other service in the system, but may process end-user requests. Some of these requirements are static (e.g., dependent on the software version), some are semi-static (e.g., dependent on the service functions enabled), and still some others may be dynamic (e.g., depending on the quality of service delivered by its supporting services, a service may adjust the requirements the service imposes on the services that the service supports). In an active object, the dependency requirements are exposed only for the functions enabled in service specification interface 510.

Service configuration 514 has three parts:
(a) configuration of supporting services;
(b) configuration of the managed service instance; and
(c) configuration of supported services.

The first part of service configuration 514 manages information on configuring supporting services so that this service instance may be deployed on top of the supporting services. A versatile service should be able to run on top of a large variety of supporting services that provide similar functionality. For example, if service can be deployed on server with AIX® operating system, then its range of operation is limited. But if the service can run on any flavor of Unix®, then the services' range of operation is larger. The service is even larger, if the service may also be deployed on servers within the Windows® operating system.

However, as the range of acceptable supporting services grows, the choices and associated deployment steps may become very complex (in addition to managing multiple software packages). That complexity is managed by the first part of service configuration 514. For each acceptable type of supporting service, service configuration 514 maintains specific information on the parameters to be set and the initialization steps to be performed (e.g., specific user and group ids may need to be created prior to executing an installation step, database tables may need to be initialized according to certain schema, a specific file system may need to be mounted, and so on).

The second part of service configuration 514 manages information on configuring the managed service instance given a set of supporting services that meet the dependency requirements. Service configuration 514 also takes into account the specific service functionality to be enabled (as described in the service specification section) and manages the configuration steps such that only the selected service functionality is enabled.

The third part of service configuration 514 manages the manner in which the dependent services are to be configured. For example, service configuration 514 may provide a plug-in so a client may interact with service configuration 514 in a specific manner, or listen on specific port so a dependent service may send requests, or publish information using a client specific topic on pub-sub messaging network, and so on.

Service deployment 516 manages the deployment of a service instance given a specific configuration of supporting services, the service functionality to be enabled, and the higher-level services to be supported. Service deployment 516 consists of three parts:
(a) deployment actions;
(b) verification and integration tests; and
(c) recovery actions.

This section manages the actions based on the configuration specified in service configuration 514. Verification and integration tests are provided to manage complex deployment steps in an incremental manner. Service deployment 516 also incorporates recovery actions in case of failures during the verification and integration tests.

Service state 518 has three parts:
(a) state of the service delivered;
(b) state of the supporting services; and
(c) state of the supported services.

The first part of service state 518 lists the service functions selected and enabled. For each one, service state 518 describes the observed and expected performance ranges. The second part of service state 518 lists the actual service instances selected to support this service. Service state 518 also describes current usage of each supporting service instance by this service, service level agreements with each service instance, and any violations. It also describes various attributes of the current state e.g., it may state that the service is deployed in dedicated mode or in shared mode and may point to corresponding policies or business rules. Similarly, the third part of service state 518 lists the actual service instances supported by this service instance, demand placed by those service instances, and current usage by the supported services. Service state 518 also lists any service level agreements with the supported services and any violations.

Lifecycle management 520 has three parts:
(a) management of the service lifecycle;
(b) management of the lifecycle of the software package used to deploy the service; and
(c) management of the lifecycle of the service management layer.

In the first part of lifecycle management 520, management of the service lifecycle is primarily concerned with "start," "stop," "pause," and "restart" type of lifecycle events on the service instance. In the second part of lifecycle management 520, the software lifecycle management is concerned with the location of the software package, actions and permissions for accessing the software package, software versioning, upgrade, and patch management. In the third part of lifecycle management 520, the lifecycle of the service management layer itself is managed. This allows the service management layer to evolve or to terminate if a particular service is to be eliminated entirely.

The activities within an active object leading to analyses and subsequent actions are driven by the state imbalances observed at the level of individual active objects. Decisions made at the analyze functional component 504 of an active object are local taking into account information available to the active object and policies applicable to active object only. The decisions do not take into account global policies or tradeoffs. For example, if an active object discovers that it has a choice of using one of two groups of supporting services that are functionally equivalent, but differ in performance, it may select one group based on local requirements using local criteria and policies without taking into account current or future needs of other services. Multiple active objects are simultaneously active and analyze functional components of multiple active objects are continuously trying to optimize the state of the services they manage, within their operational constraints. In the following, these dynamics are explained in the context of a deployment of a new service instance in response to a request for that type of service.

When a request for service cannot be served using an existing service or service composite, the active template representing the type of service requested is notified. In turn, that template evaluates the request and either instantiates a new active object to manage a new instance of that service or instructs an existing active object to reconfigure the managed object to accommodate the new request. The instructions for reconfiguration are performed simply by changing the desired state of the managed service. The actions followed in such a case are a subset of the actions followed when a new active object is created. In the following, the set of actions performed by a newly instantiated active object are described. These set of actions lead to composing and deploying a composite service from component services by recursively traversing down the dependency tree and then building up the component service tree until the entire composite service is fully configured and deployed.

At creation in the active repository, the immediate dependencies of an active object are known but are unsatisfied. When an active object is instantiated in active repository, the active object is assigned a state called a desired state and another state called the current state. The current state is the state of the service or resource managed by the active object. The desired state is the expected state of the managed service or resource.

Analyze functional component 504 in the active object continuously monitors the two states. If the two states do not match, analyze functional component 504 analyzes possible alternatives for transforming the current state to the desired state and determines if there are any dependency requirements that must be fulfilled to achieve the desired state. Thus, if the current state is "off line" and the desired state is "on line" at the time when an active object is instantiated, analyze functional component 504 in the active object examines the dependencies that need to be satisfied to make the managed service or resource go "on line." The dependency information is stored in dependency requirements 512 interface, which is one of the six management interfaces for the managed object. Each dependency is expressed in terms of the type of service or resource required. The dependency analysis identifies specific types of services or resources needed to transform the current state to the desired sate. In addition, analyze functional component 504 also determines the performance and any location constraints on the other services/resources required to satisfy the dependencies. This is a function of the desired state.

For example, if the desired state of a Web service requires processing m transactions per minute (value of m is known at this point), analyze functional component 504 first determines that the Web service would depend on a database service and then it quantifies the characteristics of the database service that can meet the performance requirements. Since the database services are characterized by the speed with which they can read and update database records, analyze functional component 504 computes the minimum read and update speeds of a database service that would qualify it as an eligible supporting service. In other words, analyze functional component 504 computes a set of performance constraints on the supporting database service. The relation between m, u, and r may be expressed by a simple algebraic formula or may require evaluation of a polynomial equation representing the approximate behavior of a database system.

The performance specific characteristics for determining the level of performance from supporting services needed to achieve a certain desired state are encoded in dependency requirements 512 interface. Note that analyze functional component 504 does not identify the exact instance of the managing service or resource to be used to satisfy a particular dependency. Analyze functional component 504 only quantifies the type of management service or resource needed and the performance, location, and security constraints on the supporting components. The information on the desired state, dependencies to be satisfied to arrive at that state, and constraints on the managing services or resources is then handed over to configure functional component 506.

Configure functional component 506 determines the actual components and the portions of their capacities to be used to fulfill the dependencies. To make this determination, for each unsatisfied dependency, configure functional component 506 contacts the active template representing the type of managing service or resource needed to satisfy that dependency. To each such active template, configure functional component 506 sends a request for the type of service it is looking for and associated constraints that must be met. Each such active template tries to fulfill the request in one of three ways: (i) assign an existing managing service or resource to provide the necessary support, (ii) reconfigure the existing service to accommodate the new demand, or (iii) configure and deploy a new service instance to provide the necessary support. When none of these alternatives are possible, configure functional component 506 sends back a negative confirmation. When it is possible to provide the support, configure functional component 506 sends back the address of the corresponding active object that manages the supporting service. Note that the performance constraints on the dependencies may be expressed as an acceptable range. In this case, the identified supporting service expected to deliver service in that range. Policies also play a role here. A policy may specify conditions when the constraints may be relaxed and may specify the extent to which they may be relaxed. The supporting active templates take these policies into account when making their decisions.

The steps followed at each supporting active template are identical to the steps described above in the context of the original request that triggered actions at the active object. These steps are followed recursively until either all the dependencies are resolved or it is determined that they cannot be resolved given a set of system resources and with the current set of policies. Thus, the entire dependency tree for providing support to any service component is traversed top-down from active templates to active objects to the supporting active templates and so on. The dependency tree of the actual services is built in a bottom up manner by following a concurrent depth-first traversal of the dependency graph.

Once the supporting services are configured and deployed in a state ready to provide the necessary support, the requesting active object is notified with a positive confirmation along with the specifics of the active objects managing the supporting services. At this point, all the managing service or resource components and their current configurations, including their available capacities, are known at for each node in the dependency graph. Using this information, configure functional component 506 quantifies the actual parameters to use in configuring the service on top of the supporting services. The parameters may include, IP addresses, communication ports to use, user ids, and passwords with access permissions to the supporting services, buffer sizes, and so on. These details depend on the type of service. This configuration information is then passed to execute functional component 508.

Execute functional component 508 executes setup and installation procedures and sends commands so that the managed service is instantiated in its desired state on top of the supporting services. The commands and procedures to be followed are stored in service deployment 516 interface of the active object. This completes the deployment of the service as a composition of component services. Following this, the user requests are processed or other higher-level services are composed on top of such a service composite.

As noted earlier, the entire process of determining the dependency tree from by the component services is traversed dynamically via the active templates and active objects in the active repository. The actual service components represented by the nodes in the dependency graph are configured and deployed in a bottom up manner by following a concurrent depth-first traversal of the dependency graph.

If the actual components are already deployed, but the actual components need to be reconfigured, the corresponding active object invokes specific actions to bring about the desired configuration changes in the component. Once a component is configured and deployed and its performance is satisfactory, the active object at the higher level in the dependency graph is notified. The next level object configures and deploys the actual component once all its supporting components are known to be ready and functional. This continues until all components, including the high-level service component are configured, deployed, and brought to the service delivery state.

Thus, at the micro-level, active objects control the active service instances they are responsible to manage. In doing so, they also influence the behavior of the supporting and supported service or resource instances. Moreover, they respond to the changes in the behavior of the supported and the supporting resources. However, the micro-level controls do not bring about simultaneous global changes that take global constraints and policies into account. Such changes are brought about by the macro-level controls. Macro-level controls are needed to enforce global policies such as manner in which critical resources are to be shared, manner in which demand is to be prioritized and served, and so on. Such policies are necessary when there are scarce resources and demand may exceed supply. The policies are also necessary when complex decisions are to be made and the tradeoffs are not clear-cut.

A novelty of this illustrative embodiment is that it enables combining global control mechanisms with the local micro-level management controls.

Figure 6:
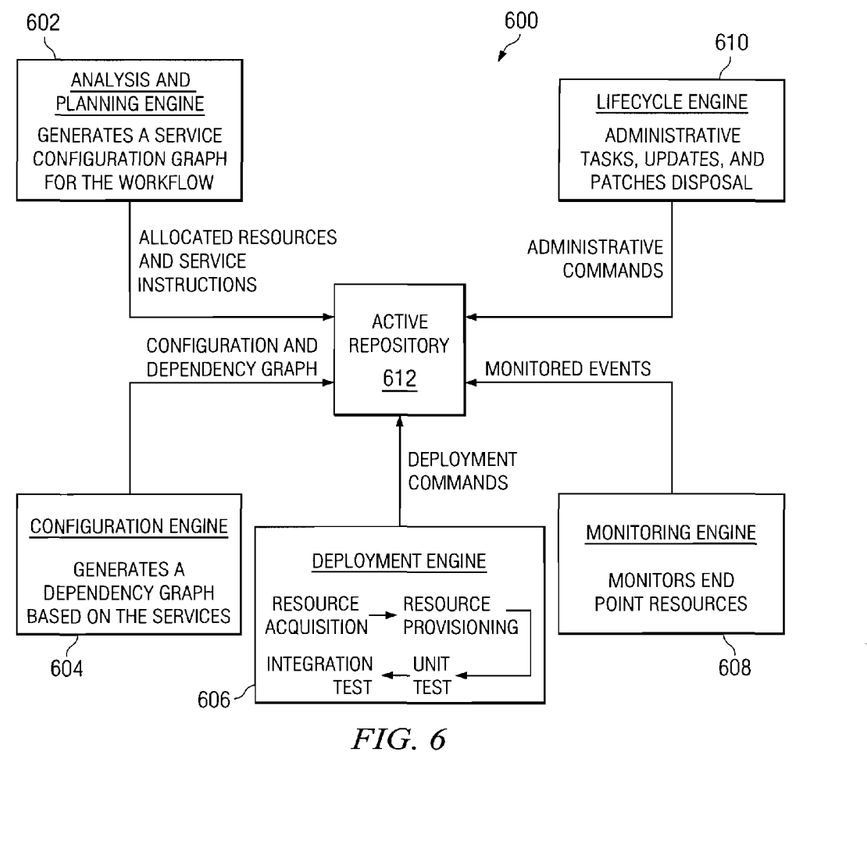
FIG. 6 depicts macro-level controls for managing the composite services in accordance with an illustrative embodiment.

FIG. 6 depicts macro-level controls for managing the composite services in accordance with an illustrative embodiment. Orchestration and management services 600 are orchestration and management services, such as orchestration and management services 310 of FIG. 3. Orchestration and management services 600 consist of management services that provide macro-level controls for managing the composite services. Orchestration and management services 600 are provided by the analysis and planning engine 602, configuration engine 604, deployment engine 606, monitoring engine 608, and lifecycle engine 610. Each of these engines interacts with active repository 612 and the management objects represented in the active repository 612.

As mentioned earlier, the analysis and subsequent actions within an active object is driven by the desired state of the managed service instance alone. However, critical services and resources may require global considerations in deciding allocations, sharing, and scheduling of such services and resources. In such cases, the analysis and planning engine 602 performs the arbitration and decisions on allocations, sharing, and scheduling. These decisions then determine the desired states of one or more active objects. Similarly, global configuration and deployment considerations result in scheduling steps at the micro-level for one or more active objects in the active repository, such as active repository 312 of FIG. 3. Thus, the macro-level controls provided by the five engines shown in FIG. 6 are transformed into micro-controls. Active objects in active repository 612 control the corresponding resource and component services so that the desired effects of the macro controls are realized at the micro-level.

As stated earlier, an active repository manages all life-cycle aspects of software service components so as to deliver solutions in response to service requests. The active repository performs this function taking into account related system management policies as well constraints placed by the availability of physical resources. One aspect of this life-cycle management is the composition of a complex service whenever there is a demand for such a service. Another aspect is the tearing down or decomposition of a complex service when there is no demand, or policies require such an action, or one or more supporting services are unavailable.

Figure 7:
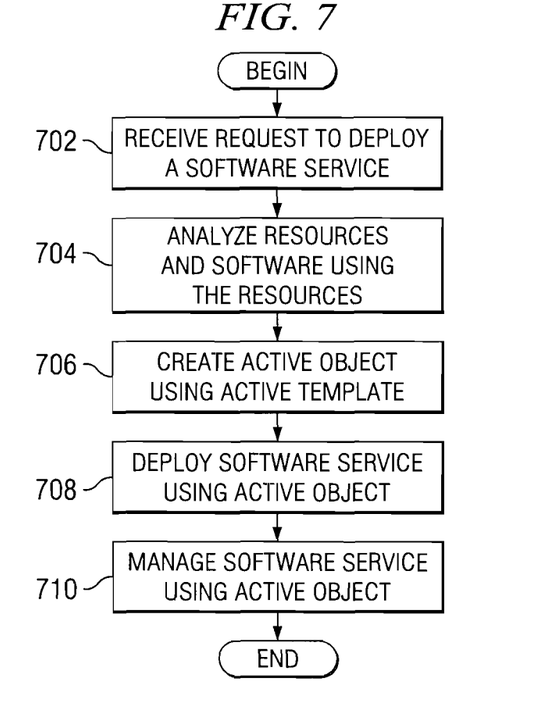
FIG. 7 depicts a flowchart of an operation used to deploy and manage a software service in accordance with an illustrative embodiment.

As an illustrative example, FIG. 7 depicts a flowchart of an operation used to deploy and manage a software service in accordance with an illustrative embodiment. As the operation begins, a request is received to deploy a software service in a computer network (step 702). If the requested software service is a new software service, the existing active templates and active objects in the active repository, such as active repository 312 of FIG. 3, perform an analysis of physical resources associated with the requested software service to be managed and a current set of software services using these resources (step 704).

A new software service is a service that is not currently managed by an existing active object. Following this analysis, the active template representing the type of the new service to be created, first instantiates an active object in the active repository (step 706). This active object manages the new software service. The active repository deploys the software service in the network using the active object (step 708) and the active object manages the software service (step 710) with the operation ending thereafter. The actual deployment of the software service is performed using methods described in related applications. After the active object is created, the active object manages the software service as described with relation to FIG. 5.

If the requested software is an existing software service, the active repository identifies an existing active object that manages the existing software service. The existing software service is deployed in the network using the existing active object and managed using the existing active object.

Thus, the illustrative embodiments receive a request for service. If the requested service is currently not deployed, the embodiment, responsive to the requested software service being a new software service, perform an analysis of physical resources and other component software services required to configure and deploy the requested software service to be managed so it can serve this request and other similar requests. These steps may result in identifying other component software services that may need to be configured or reconfigured and deployed or redeployed. The illustrative embodiments perform the necessary actions so the requested service can be made available as a composition of one or more managed service components to process the request.

The illustrative embodiments also respond to requests for services that are currently deployed but not configured in a form desired for processing the request. The illustrative embodiments takes actions by reconfiguring and/or redeploying one or more service components and resources so the requested service can be deployed with the desired configuration. The illustrative embodiments create an active object to manage the new software service using an active template based on the analysis. Finally, the illustrative embodiments deploy the new software service in the network using the active object and manage the new software service using the active object. The active objects in the active repository interact with one another while controlling and managing the software services. These interactions lead to service management actions such that desired service compositions are realized by the component software services and the compositions are maintained in their desired states.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for management of a software service, the computer implemented method comprising:

receiving a request to deploy the software service in a computer network;

responsive to the software service being a new software service, performing a dependency analysis for the requested software service to determine component software services and a first set of physical resources necessary to deploy and manage the new software service as a composite;

creating an active object to manage the new software service using an active template based on the dependency analysis, wherein the active object is configured to make one or more decisions by interacting with other active objects of other software services deployed in the computer network;

responsive to the one or more decisions, deploying the new software service in the computer network using the active object and in accordance with the one or more decisions made by the active object; and managing the new software service using the active object, wherein managing the new software service comprises:

monitoring the new software service to determine if the new software service must be re-deployed on a second set of physical resources based on a policy; and responsive to the determination that the new software service must be re-deployed on the second set of physical resources, re-deploying the new software service to the second set of physical resources.

2. The computer implemented method of claim 1, wherein the dependency analysis is triggered by an imbalance in a current state and a desired state of the software service, wherein the imbalance in the current state and the desired state may occur in response to at least one of a service request, a request from a dependent service, global policies, global management actions, administrative actions, a supporting service, a supporting physical resource, or a spontaneous change in a state of the software service.

3. The computer implemented method of claim 1, wherein the active object performs at least one of a monitoring function, an analyzing function, a configuration function, or an execution function.

4. The computer implemented method of claim 1, wherein the active template represents one of a plurality of physical resources or one of a plurality of software service types in the computer network.

5. The computer implemented method of claim 1, wherein the active object uses a plurality of management interfaces to manage the new software service.

6. The computer implemented method of claim 5, wherein the plurality of management interfaces comprises at least one of a service specification interface, a dependency requirements interface, a service configuration interface, a service deployment interface, a service state interface, or a lifecycle management interface.

7. The computer implemented method of claim 6, wherein the service specification interface identifies functionalities provided by the new software service.

8. The computer implemented method of claim 6, wherein the dependency requirements interface provides at least one of:
    identifying the physical resources required for making the new software service available; or
    identifying other software services required for making the new software service available; or
    identifying other software services that depend on the new software service.

9. The computer implemented method of claim 6, wherein the service configuration interface provides at least one of:
    managing information on configuring supporting services so that the new software service is deployed on top of the supporting services;
    managing information on configuring the new software service given a set of the supporting services that meet a dependency requirement; or
    managing a manner in which the dependent services are to be configured.

10. The computer implemented method of claim 6, wherein the service deployment interface provides at least one of:
    managing deployment of the new software service given a specific configuration of supporting services;
    managing a new software service functionality to be enabled; or
    managing higher-level software services to be supported.

11. The computer implemented method of claim 6, wherein the service state interface provides at least one of:
    listing software service functions selected and enabled;
    listing first actual software service instances selected to support the new software service;
    listing second actual software service instances supported by the new software service, demand placed by software service instances, or current usage by supported services;
    listing any service level agreements with supported software service instances; or
    listing any service level agreement violations.

12. The computer implemented method of claim 6, wherein the lifecycle management interface provides at least one of:
    managing a service lifecycle;
    managing a lifecycle of a software package used to deploy the new software service; or
    managing a lifecycle of a service management layer.

13. The computer implemented method of claim 1, further comprising:
    responsive to the software service being an existing software service, identifying an existing active object that manages the existing software service;
    reconfiguring and deploying the existing software service in the computer network using the existing active object; and
    managing the existing software service using the existing active object.

14. The computer implemented method of claim 1, wherein a plurality of software services are simultaneously managed by a plurality of active objects from an active repository, wherein each active object responds to state imbalances in the software service it manages.

15. A data processing system comprising:
    a bus system;
    a communications system connected to the bus system;
    a memory connected to the bus system, wherein the memory includes a set of instructions; and
    a processing unit connected to the bus system, wherein the processing unit executes the set of instructions to receive a request to deploy a software service in a computer network;
    perform a dependency analysis for the software service to determine component software services and a first set of physical resources necessary to deploy and manage the software service as a composite in response to the software service being a new software service; create an active object to manage the new software service using an active template based on the dependency analysis, wherein the active object is configured to make one or more decisions by interacting with other active objects of other software services deployed in the computer network; responsive to the one or more decisions, deploy the new software service in the computer network using the active object and in accordance with the one or more decisions made by the active object; and manage the new software service using the active object wherein managing the new software service comprises:
    monitoring the new software service to determine if the new software service must be re-deployed on a second set of physical resources based on a policy; and
    responsive to the determination that the new software service must be re-deployed on the second set of physical resources, re-deploying the new software service to the second set of physical resources.

16. The data processing system of claim 15, wherein the dependency analysis is triggered by an imbalance in a current state and a desired state of the software service, wherein the imbalance in the current state and the desired state may occur in response to at least one of a service request, a request from a dependent service, global policies, global management actions, administrative actions, a supporting service, a supporting physical resource, or a spontaneous change in a state of the software service.

17. A non-transitory computer program product comprising:
- a computer usable storage medium including computer usable program code for management of a software service, the non-transitory computer program product including:
- computer usable program code for receiving a request to deploy the software service in a computer network;
- computer usable program code for performing a dependency analysis for the software service to determine component software services and physical resources necessary to deploy and manage a new software service as a composite in response to the software service being a new software service;
- computer usable program code for creating an active object to manage the new software service using an active template based on the dependency analysis, wherein the active object is configured to make one or more decisions by interacting with other active objects of other software services deployed in the computer network;
- computer usable program code for deploying, responsive to the one or more decisions, the new software service in the computer network using the active object and in accordance with the one or more decisions made by the active object; and
- computer usable program code for managing the new software service using the active object.

18. The non-transitory computer program product of claim 17, wherein the dependency analysis is triggered by an imbalance in a current state and a desired state of the software service, wherein the imbalance in the current state and the desired state may occur in response to at least one of a service request, a request from a dependent service, global policies, global management actions, administrative actions, a supporting service, a supporting physical resource, or a spontaneous change in a state of the software service.

19. A system having an active repository comprising:
- one or more processors, one or more computer readable memories, and one or more non-transitory computer readable storage devices;
- a plurality of active templates stored in the one or more non-transitory computer readable storage devices; and
- an active object repository containing program instructions stored on the one or more non-transitory computer readable storage devices, wherein the program instructions are configured for execution on the one or more processors via the one or more memories to:
  - receive a request to deploy a software service in a computer network;
  - perform a dependency analysis for the software service to determine component software services and a first set of physical resources necessary to deploy and manage the software service as a composite in response to the software service being a new software service;
  - create an active object to manage the new software service using an active template based on the dependency analysis, wherein the active object is configured to make one or more decisions by interacting with other active objects of other software services deployed in the computer network;
  - responsive to the one or more decisions, deploy the new software service in the computer network using the active object and in accordance with the one or more decisions made by the active object; and
- wherein the active object manages the new software service by monitoring the new software service to determine if the new software service must be re-deployed on a second set of physical resources based on a policy, and responsive to the determination that the new software service must be re-deployed on the second set of physical resources, by re-deploying the new software service to the second set of physical resources.

20. The active repository of claim 19, wherein the dependency analysis is triggered by an imbalance in a current state and a desired state of the software service, wherein the imbalance in the current state and the desired state may occur in response to at least one of a service request, a request from a dependent service, global policies, global management actions, administrative actions, a supporting service, a supporting physical resource, or a spontaneous change in a state of the software service.

* * * * *